US006565538B2

(12) United States Patent
Quinn et al.

(10) Patent No.: US 6,565,538 B2
(45) Date of Patent: May 20, 2003

(54) ORIENTATIONALLY ADJUSTABLE MARKING SYRINGE

(75) Inventors: Kimberly Quinn, Kenansville, NC (US); Thomas Hogan, Marietta, GA (US)

(73) Assignee: Prima Tech USA, Powder Springs, GA (US)

( * ) Notice: Subject to any disclaimer, the term of this patent is extended or adjusted under 35 U.S.C. 154(b) by 0 days.

(21) Appl. No.: 09/872,547

(22) Filed: Jun. 2, 2001

(65) Prior Publication Data

US 2002/0183698 A1 Dec. 5, 2002

(51) Int. Cl.[7] .................. A61M 5/00; A61M 5/178; A61M 5/315
(52) U.S. Cl. .................. 604/181; 604/187; 604/227; 604/186
(58) Field of Search .................. 604/191, 181, 604/187, 116, 61, 207, 208–211, 223, 224, 227, 228, 115, 218, 186, 130; 222/137, 391, 327, 82, 135; 81/9.22; 606/116, 117; 128/DIG. 6

(56) References Cited

U.S. PATENT DOCUMENTS

| 5,961,494 A | * | 10/1999 | Hogan | 604/191 |
| 6,264,637 B1 | * | 7/2001 | Hogan | 604/191 |
| 6,401,071 B1 | * | 6/2002 | Hogan | 340/572.1 |
| 6,406,460 B1 | * | 6/2002 | Hogan | 128/DIG. 13 |
| 2002/0087437 A1 | * | 7/2002 | Hogan | 705/28 |

* cited by examiner

Primary Examiner—Brian L. Casler
Assistant Examiner—Catherine Serke
(74) Attorney, Agent, or Firm—Wm. Brook Lafferty; Troutman Sanders LLP

(57) ABSTRACT

An orientationally adjustable marking syringe provides automatic loading of medicine from a medicine source to the syringe. Actuation of the handles of the syringe simultaneously discharges or injects the contents of the syringe and a marking substance such as ink contained in an ink dispenser integrally attached to the marking syringe by a pivoting ink carriage. The pivoting ink carriage can be pivoted about the syringe to better accommodate the ergonomic desires of the user and the objectives of the injection.

13 Claims, 3 Drawing Sheets

ORIENTATIONALLY ADJUSTABLE MARKING SYRINGE

TECHNICAL FIELD

The present invention relates to syringes for providing medicine injections to animals.

BACKGROUND

Recent outbreaks of animal diseases such as "Foot and Mouth" and BSE (also known as "Mad Cow" disease) are threatening both the livelihoods of food animal producers and the safety of one of the critical staples of world food supply. Now—more than ever—reliable and efficient mechanisms for administering vaccines and other medicines to food animals are necessary.

In recent years, numerous mechanisms have been developed that improve the way medicines are delivered to food animals. For instance, the commercially available VAC-MARC syringe—elements of which are taught in issued U.S. Pat. Nos. 5,961,494 and 6,264,637 (both to the inventor herein and both specifically incorporated herein by reference), available through VAC-PAC Corporation of Kenansville, N.C. (1-800-4VACPAC). This family of syringes allows the simultaneous marking of a food animal at the same time an injection is applied to the animal. As described in these referenced patents, this technique allows verification that an animal has received an injection, as well as indicating where on the animal the injection was applied, an important fact in effectively delivering medicines to animals.

Another important development in animal medicine delivery is disclosed in pending U.S. patent application Ser. No. 09/477,262, also to Hogan. This system, available commercially as the VAC-TRAC Verification System ("VTVS") provides—among other things—a mechanism to automatically and electronically record the unique identity of an animal that has received an injection. As disclosed in that pending application, each food animal is given an electronic identification device ("EID") that emits a unique identification signal. When the VAC-TRAC syringe is actuated and delivers the injection to the animal, a reader on the syringe reads the unique identification signal relating to the animal and transmits to a computer database the identification of the animal and the medicine applied to the animal, thus creating a verifiable database of medical administrations to food animals.

Notwithstanding these important developments, most animal injections—including injections from each of these previously discussed systems—are delivered by a hand-actuated syringe. That is, the syringe is held in one hand and actuated when opposing syringe handles are squeezed together. In each of the above-described devices, the mark is placed on the animal in a position dictated by the orientation of the syringe.

In many situations, the position of the animal receiving the injection and the position of the individual administering the injection leads to an undesirable orientation of the portion of the marking syringe that delivers the mark. Depending on the particular medication in question and the preferred location of the injection, a mark placed in a less than optimal position may be difficult to see or even harmful to the animal. One possible cause of this difficulty could be the medicine administrator—right handers, for instance, will typically hold the syringe in an orientation different from their left-handed counterparts.

Accordingly, a need exists for a marking syringe with an orientationally adjustable marking apparatus.

A further need exists for a marking syringe with an orientationally adjustable marking apparatus that can be easily moved and locked from one position to another, while still allowing the action of actuating the integral medicine syringe to actuate the marking apparatus.

BRIEF SUMMARY OF THE INVENTION

These and other shortcomings in currently available marking syringes are solved by the orientationally adjustable marking syringe of the present invention.

The marking syringe comprises a vaccine syringe including a needle for insertion and delivery of medicine into an animal. Integral to the vaccine syringe is a pivoting ink dispenser having a discharge orifice for discharging ink or another marking substance onto the animal. A syringe handle captures both the vaccine syringe and the pivoting ink dispenser and allowing substantially simultaneous actuation of both the vaccine syringe and the pivoting ink dispenser.

DETAILED DESCRIPTION OF EXEMPLARY EMBODIMENTS

Figure 1:
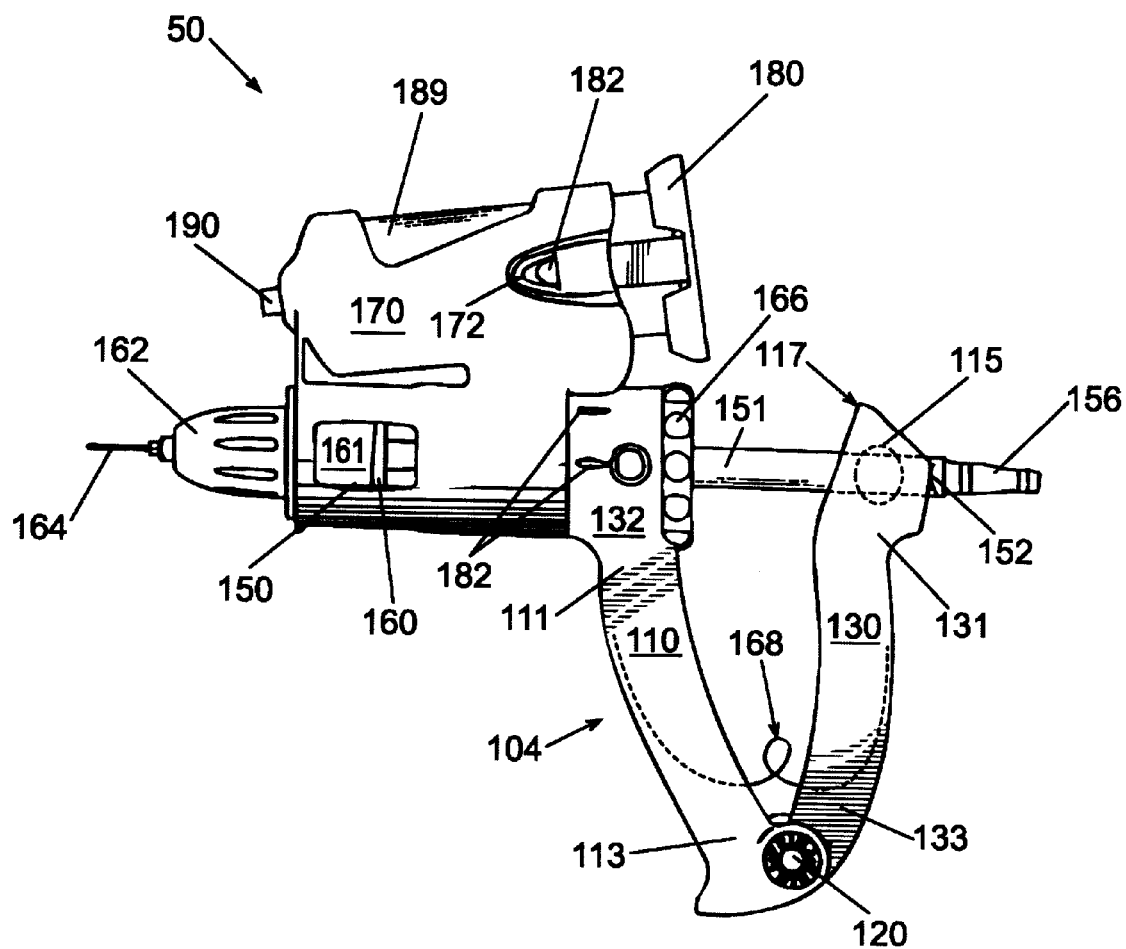
FIG. 1 depicts an exemplary embodiment of the present invention.

FIG. 1 depicts an exemplary embodiment of the marking syringe 50. More particularly, the marking syringe 50 of the preferred embodiment comprises, generally, a syringe handle 104 operatively connected to a syringe 150 and a pivoting ink carriage 170. The syringe handle 104 comprises a first handle 110 pivotally connected to a second handle 130. The second handle 130 is elongated, having a first end 131 and a second end 133. An ink dispenser interface 117 is located generally adjacent to the socket 115 on the second handle 130. The second handle 130 has a pivot hole in its second end 133.

The first handle 110 of the marking syringe 50 is also elongated and has a first end 111 and a second end 113. The first handle 110 is configured to function as a finger grip for the user. The second end 113 of the first handle 110 is sized to slidably straddle the second end 133 of the second handle 130 and has a pivot hole through its thickness. The first handle 110 includes an integral syringe collar 132 and a rotatably attached pivoting ink carriage 170.

During assembly, the second end 113 of the first handle 110 is positioned over the second end 133 of the second handle 130 such that the pivot holes in he ends 113, 133 are axially aligned. Thereafter, a pivot pin 120 is inserted through the aligned holes and appropriately secured therein in any number of ways, including deforming distal ends of the pivot pin 120 so that the diameter of the pivot pin 120 is larger at the points of deformation than the diameter of the pivot pin receiving holes, thereby preventing withdrawal of the pivot pin 120 through the pivot receiving holes. After the pivot pin 120 is properly positioned and secured, the second handle 130 rotates about the axis of the pivot pin 120 in a plane defined by the second handle 130 and the first handle 110. In use, the first and second handles 110, 130 are initially biased in a spread position. The user can then grip the first and second handles 110, 130 and squeeze them into a closed position as the handles 110, 130 pivot about the pin 120.

The syringe 150 is mounted between the handles 110, 130 by means of the syringe collar 132 on the first handle 110 and the socket 115 on the second handle 130. The syringe 150 includes a syringe shaft 151, a syringe plunger 160, a syringe dosage chamber 161, a syringe needle fastener 162, and a needle 164. In order to connect the syringe 150 to the syringe handle 104, the dosage chamber 161 is threaded into the syringe collar 132 of the first handle 110, and the syringe head 152 is connected to the second handle 130 by engaging the syringe head 152 into the socket 115 of the second handle 130 in a well known manner.

The syringe head 152 is hollow and further comprises a syringe nipple 156. The syringe nipple 156 may be integral to the hollow syringe head 152 and is sized to securely receive a syringe vaccine hose (not shown). Vaccine is delivered to the hollow interior cavity of the syringe head 152 via the vaccine hose (not shown) which is connected to a vaccine source (not shown).

The syringe shaft 151 connects the syringe head 152 to the plunger 160. The syringe shaft 151 has an interior axial conduit (not shown) which communicates at one end with the interior cavity of the syringe head 152 and at the other end with an interior axial conduit (not shown) through the syringe plunger 160. The syringe shaft 151 extends through the syringe collar 132 of the first handle 110 and into the syringe dosage chamber 161. In order to vary the amount of the dosage, the syringe shaft 151 has a dosage adjust valve 166. The dosage adjust valve 166 comprises a collar that engages the plunger 160 on one end and is threaded onto the syringe shaft 151.

After adjustment of the dosage adjust valve 166 to regulate the amount of medicine loaded into the syringe for a single injection, and actuation of the marking syringe 50, the syringe plunger 160 slides within the dosage chamber 161. An O-ring (not shown) disposed about the syringe plunger 160 creates a liquid-tight seal between the periphery of the syringe plunger 160 and the interior wall of the dosage chamber 161. The syringe plunger 160 has a check valve (not shown) within its interior axial conduit that allows liquid to pass only in the direction toward the needle end of the syringe 150.

The syringe dosage chamber 161 is ideally formed of a translucent or transparent material and is secured at its first end to the syringe collar 132. The dosage chamber 161 may be scored with incremental graduations to assist a user in dosage measurements. At its second end, the dosage chamber 161 removably receives a syringe needle fastener 162. The syringe needle fastener 162 is fitted to capture a needle 164. A check valve (not shown) is fitted within the syringe needle fastener 162 to allow liquid flow only out of the needle 164.

In one embodiment, a syringe biasing spring 168 may be disposed about the syringe shaft 151. In such embodiment, the biasing spring 168 is a compression spring which serves to return the syringe handles 110, 130 to their initial spread position after being squeezed closed by the user. In an alternate embodiment, depicted, the syringe handles 110 and 130 are biased apart by a leaf spring, having one end frictionally positioned against the inside of one handle and another end frictionally positioned against the inside of the other handle. In such embodiment, the biasing tension of the spring may be adjusted by modifying the distance between either (or both) of the ends of the spring and the respective insides of the handles against which they are frictionally positioned.

When the handles 110, 130 are squeezed together, the plunger 160 moves within the dosage chamber 161. The movement of the plunger 160 closes the check valve within the plunger 160 to force vaccine in the dosage chamber 161 through the check valve within the needle fastener 162 and out through the needle 164. When the handles 110, 130 are released by the user, the check valve within the needle fastener 162 closes to preclude fluid or air being drawn into the dosage chamber 161 through the needle 164. Simultaneously, the check valve within the plunger 160 opens so that vaccine is drawn into the dosage chamber 161 through the nipple 156, the syringe head 152, the conduit within the shaft 151, and the conduit within the plunger 160. By turning the dosage adjust valve 166, the length of the syringe shaft 151 is changed. Changing the length of the shaft 151 changes the length of the plunger stroke, and the amount of medicine delivered through the needle 164 is correspondingly changed.

The pivoting ink carriage 170 is functional to capture an ink dispenser 189. The ink dispenser 189 may take any number of forms well known to those skilled in the art of marking substance containers, including, but not limited to, a canister, a jar, a tube, or the like. Further, the specific form of ink dispenser 189 may be dependent upon the type of ink being utilized. For instance, a pressurized canister maybe used to store ink that is suspended in, or in the form of, a compressed gas. Alternatively, a structure such as that used to store household caulk may be used to store liquid ink suitable for the particular application.

To support and retain the ink dispenser 189, the first handle 110 rotatably supports the pivoting ink carriage 170. The pivoting ink carriage 170 may take any number of forms well known to those skilled in the art of mechanical design. It will be appreciated that its form is dependent upon the physical characteristics of the particular ink dispenser 189 being used.

The pivoting ink carriage 170 is, as previously indicated, rotatably interconnected to the syringe collar 132 of the marking syringe 150. The critical aspects of this rotatable interconnection are the ability of the pivoting ink carriage 170 to be rotated about the syringe collar 132, and the ability of the rotatable interconnection therebetween to hold the pivoting ink carriage 170 in whatever position it has been rotated to.

In operation, a user of the marking syringe 50 may determine that he prefers to have the ink dispenser 189 in a position relative to the syringe handle 104 other than the vertical ("12 O'clock") position shown in FIG. 1. The user can, by using the force of a hand, pivot the pivoting ink carriage 170 about the syringe collar 132 to a more desirable point. When the user releases the pivoting ink carriage 170, it will remain in the position in which it was left—until it is moved again. A wide variety of mechanisms will be suitable for accomplishing this functionality and may include ridges 182 on one of either the syringe collar 132 (as depicted) or the interior of the pivoting ink carriage 170 which communicates with the syringe collar 132. Corresponding and opposing indentations for receiving the ridges 182 are located on the other, communicating surface. While the opposing ridges 182 and indentations fit securely together, they can be disengaged with the application of sufficient rotating force applied to the pivoting ink carriage 170. Thus, the position of the pivoting ink carriage 170 can be adjusted manually while retaining its position after adjustment.

The pivoting ink carriage 170 is sized to receive an ink dispenser 189 in the manner generally depicted in FIG. 1. The ink dispenser 189 is retained within the pivoting ink carriage 170 by the frictional interconnection between the can detente 180 and the latch catch 172.

The can détente 180 is described with great specificity in pending U.S. patent application Ser. No. 09/848,495, also to the inventors of the present invention, and is specifically incorporated by reference herein. The can détente 180 includes at least one latch hook 182. When the latch hook 182 is inserted into the pivoting ink carriage 170, it is caught by the latch catch 172 within the pivoting ink carriage 170. This action secures the can détente 180 (and importantly, the ink dispenser 189 attached thereto) within the pivoting ink carriage 170.

In operation, the handles of the marking syringe 50 are squeezed together and pivot about the pivot pin 120. The ink dispenser interface 117 contacts the can detente 180 no matter what pivot position the pivoting ink carriage 170 is in. As the ink dispenser interface 117 is pressed against the can detente 180, the can detente 180 and the attached ink dispenser 189 are urged toward the needle end of the marking syringe 50. As the pivoting ink carriage 170 only pivots and does not move forward in any appreciable way, the ink dispenser 189 is forced against the front of the pivoting ink carriage 170 and an amount of ink (or other marking substance) is discharged from the ink dispenser 189 onto the subject animal through a discharge orifice 190 in a well known manner.

Figure 2:
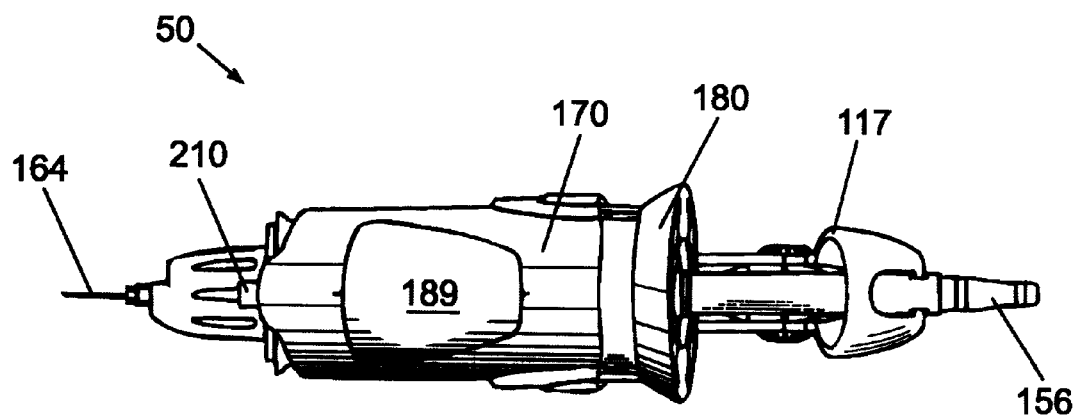
FIG. 2 depicts a top view of an exemplary embodiment of FIG. 1.

FIG. 2 is a top view of the embodiment of the present invention previously described in FIG. 1. In the present configuration of the embodiment of FIG. 1, the pivoting ink carriage 170 is positioned directly above the syringe 150 in what may be described as the "12 O'clock position". In operation, a medicine source would be connected to the syringe nipple 156. As the syringe handles 110, 130 are squeezed together, the ink dispenser interface 117 contacts the can detente 180. This pressure on the can détente 180 urges the ink dispenser 189 toward the needle 164, forcing the ink dispenser 189 to discharge ink in the direction of the animal being injected via a discharge orifice 210.

Figure 3:
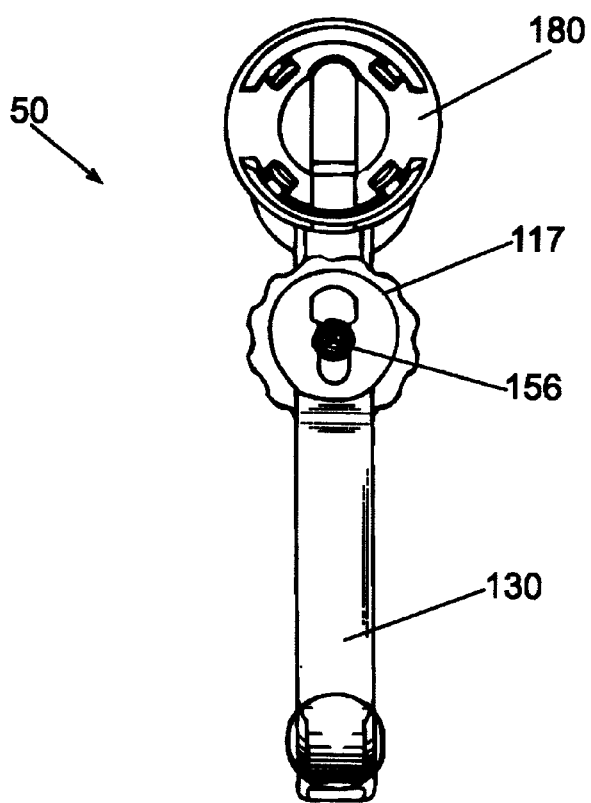
FIG. 3 depicts a rear view of the exemplary embodiment of the present invention depicted in FIG. 1.

FIG. 3 depicts a rear view of the marking syringe 50. More particularly, the second handle 130 is visible, along with the syringe nipple 156 extending rearwardly therethrough. Because the handles 110, 130 have not been compressed, the ink dispenser interface 117 is distant from the can detente 180. As previously described, when handles 110, 130 are squeezed together, the ink dispenser interface 117 contacts the can detente 180, urging the ink dispenser 189 forward and forcing discharge of ink therefrom.

Figure 4:
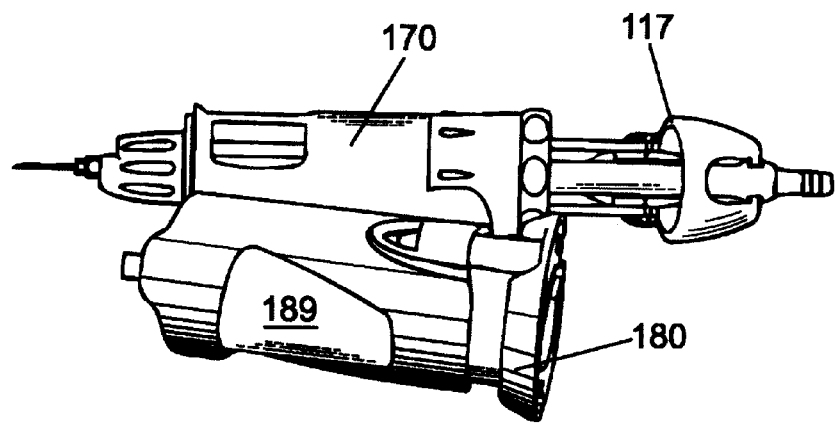
FIG. 4 depicts a top view of an exemplary embodiment of the present invention, with the pivoting ink carriage moved.

Referring now to FIG. 4, a top view of the marking syringe 50 is depicted, with the pivoting ink carriage 170 having been pivoted out of the "12 O'clock" position to better accommodate the preferences of a user.

Figure 5:
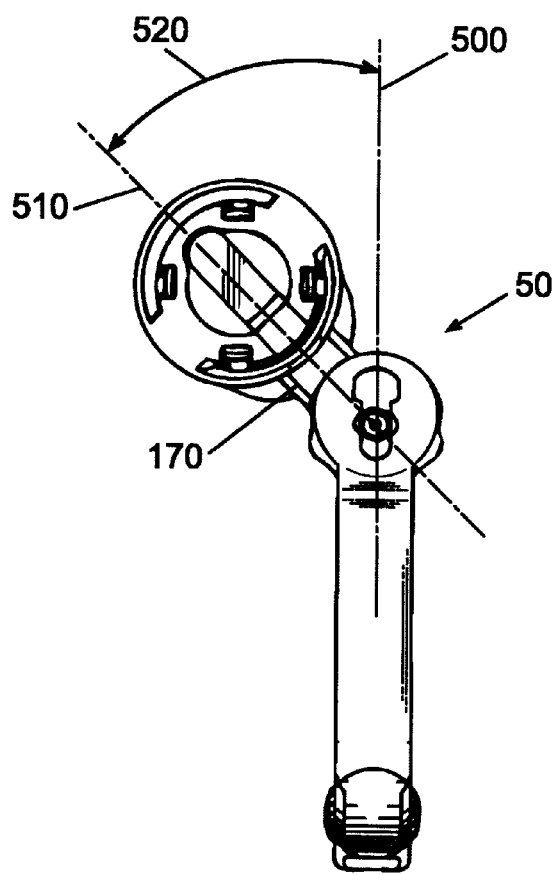
FIG. 5 depicts a rear view of an exemplary embodiment of the present invention, with the pivoting ink carriage moved.

FIG. 5 graphically illustrates the rotation of the pivoting ink carriage. Notably, the pivoting ink carriage, once aligned with axis 500, has been rotated about the syringe collar 132 so that it now aligns with axis 510, thereby representing a change of position represented by displacement angle 520. Importantly, the pivoting ink carriage 170 can be rotated in either direction.

It will be understood and appreciated that the above description of a preferred embodiment of the present invention is not intended to limit the scope of the present invention. Rather, the scope of the present invention is fully recognized in the appended claims.

We claim:

1. An orientationally adjustable marking syringe, comprising:
   a. a vaccine syringe including a needle for insertion into an animal;
   b. a pivoting ink dispenser including a discharge orifice for discharging onto the animal, the pivoting ink dispenser adapted to pivot about the vaccine syringe; and
   c. a syringe handle for allowing substantially simultaneous actuation of both the vaccine syringe and the pivoting ink dispenser.

2. The orientationally adjustable marking syringe of claim 1, wherein the handle comprises:
   a. a first handle for capturing the vaccine syringe and the pivoting ink dispenser; and
   b. a second handle for actuating the vaccine syringe and the pivoting ink dispenser substantially simultaneously.

3. The orientationally adjustable marking syringe of claim 2, wherein the pivoting ink dispenser is integrally formed within a pivoting carriage, the pivoting carriage being pivotably attached to the first handle in general axial alignment with the vaccine syringe.

4. The orientationally adjustable marking syringe of claim 1, wherein the first handle and the second handle are pivotally connected to each other.

5. The orientationally adjustable marking syringe of claim 4, wherein the vaccine syringe comprises a vaccine dosage chamber for receiving a vaccine plunger, a vaccine plunger shaft for interconnecting the vaccine plunger and a vaccine syringe head, and a source of vaccine connected to the vaccine syringe head, wherein vaccine is drawn into the vaccine dosage chamber from the vaccine source through the vaccine syringe head, the vaccine plunger shaft, and the vaccine plunger; and the vaccine syringe head is connected to the second handle.

6. The orientationally adjustable marking syringe of claim 1, wherein the first handle and the second handle are urged apart by a squeeze tension spring disposed therebetween.

7. The orientationally adjustable marking syringe of claim 1, wherein the substantially simultaneous actuation of both the vaccine syringe and the ink dispenser are accomplished by actuation of a trigger, the trigger being functionally interconnected to a source of compressed gas, actuation of the trigger causing a discharge of a quantity of compressed gas from the source of compressed gas so as to actuate both the vaccine syringe and the ink dispenser.

8. An orientationally adjustable marking syringe, comprising:
   a. a vaccine syringe including a needle for insertion into an animal;
   b. a pivoting ink dispenser including a discharge orifice for discharging onto the animal, the pivoting ink dispenser adapted to pivot about the vaccine syringe; and
   c. a syringe handle wherein the syringe handle comprises a first handle and a second handle pivotally connected to one another for allowing substantially simultaneous actuation of both the vaccine syringe and the pivoting ink dispenser.

9. The orientationally adjustable marking syringe of claim 8, wherein the pivoting ink dispenser is integrally formed within a pivoting carriage, the pivoting carriage being pivotably attached to the first handle in general axial alignment with the vaccine syringe.

10. The orientationally adjustable marking syringe of claim 8, wherein the vaccine syringe comprises a vaccine dosage chamber for receiving a vaccine plunger, a vaccine plunger shaft for interconnecting the vaccine plunger and a vaccine syringe head, and a source of vaccine connected to the vaccine syringe head, wherein vaccine is drawn into the vaccine dosage chamber from the vaccine source through the vaccine syringe head, the vaccine plunger shaft, and the vaccine plunger; and the vaccine syringe head is connected to the second handle.

11. The orientationally adjustable marking syringe of claim 8, wherein the first handle and the second handle are urged apart by a squeeze tension spring disposed therebetween.

12. The orientationally adjustable marking syringe of claim 8, wherein the substantially simultaneous actuation of both the vaccine syringe and the ink dispenser are accomplished by actuation of a trigger, the trigger being functionally interconnected to a source of compressed gas, actuation of the trigger causing a discharge of a quantity of compressed gas from the source of compressed gas so as to actuate both the vaccine syringe and the ink dispenser.

13. An orientationally adjustable marking syringe, comprising:

a. a vaccine syringe including a needle for insertion into an animal;

b. a pivoting ink dispenser including a discharge orifice for discharging onto the animal; and c. a syringe handle for allowing substantially simultaneous actuation of both the vaccine syringe and the pivoting ink dispenser, the syringe handle comprising a first handle and a second handle, the second handle for actuating the vaccine syringe and the pivoting ink dispenser, wherein the pivoting ink dispenser is integrally formed within a pivoting carriage, and the pivoting carriage being pivotally attached to the first handle in general axial alignment with the vaccine syringe.

* * * * *